United States Patent [19]
Childs et al.

[11] Patent Number: 5,014,679
[45] Date of Patent: May 14, 1991

[54] GAS FIRED COMBINATION CONVECTION-STEAM OVEN

[75] Inventors: Paul Childs, Swampscott; James R. Hurley, E. Weymouth; Conrad J. Orcheski, Maynard, all of Mass.

[73] Assignee: Tecogen, Inc., Waltham, Mass.

[21] Appl. No.: 408,691

[22] Filed: Sep. 18, 1989

[51] Int. Cl.⁵ .................................... F24C 15/32
[52] U.S. Cl. .................. 126/21 A; 126/369; 99/476
[58] Field of Search .............. 126/369, 21 A, 113; 99/476; 219/401

[56] References Cited

U.S. PATENT DOCUMENTS

| | | | |
|---|---|---|---|
| 1,839,618 | 1/1932 | Toepfer | 126/113 |
| 2,354,773 | 8/1944 | Ray | 126/113 |
| 3,156,292 | 11/1964 | Ross | 431/354 |
| 3,262,444 | 7/1966 | Davidson | 126/113 |
| 3,639,725 | 2/1972 | Maniscalco . | |
| 4,109,129 | 8/1978 | Satoh . | |
| 4,173,215 | 11/1979 | Bureau . | |
| 4,700,685 | 10/1987 | Miller . | |
| 4,701,334 | 10/1987 | Durth . | |
| 4,722,321 | 2/1988 | Meister . | |
| 4,800,806 | 1/1989 | Durth . | |

*Primary Examiner*—Carroll B. Dority
*Attorney, Agent, or Firm*—Fish & Richardson

[57] ABSTRACT

Disclosed is a gas-fired oven for heating food by steam and/or dry convection. The oven has a heating chamber; an atomizer for producing an atomized water spray; a source of a combustible gas mixture; and a burner-heat exchanger. The gas fired burner-heat exchanger receives and combusts the mixture and isolates hot combustion gases from the heating chamber so pure steam is furnished to the heating chamber. The heat exchanger receives hot combustion gases, and vaporizes atomized spray circulated over its external surface to produce steam for heating an article in the heating chamber. The amount of steam in the heating chamber is measured and controlled by monitoring a temperature in a drain.

22 Claims, 8 Drawing Sheets

GAS FIRED COMBINATION CONVECTION-STEAM OVEN

FIELD OF THE INVENTION

This invention relates to combination ovens using steam and/or dry convection gas for heating articles.

BACKGROUND OF THE INVENTION

The recent emphasis of health and its association with food has increased the use of steam cooking because of its unique capabilities. The flavor of many foods is retained when cooked with steam and is sometimes enhanced. Nutrients, such as vitamins, minerals, etc., are less prone to degradation when foods are cooked with steam. The appearance, texture, and color, especially of delicate foods such as vegetables, remain pleasing when cooked with steam. Of concern to the commerical food sector is time; applications of steam to commercial cooking can result in faster food preparation.

For browning of some foods, such as roasts for example, it is sometimes advantageous to maintain drier food surfaces at high temperatures by the use of dry air convection heating.

Oftentimes a combination of steam and convection heating is desired U.S. Pat. No. 4,700,685 to Miller issued Oct. 20, 1987, discloses an oven for cooking foodstuffs with either steam or convection hot air. A slinger cup atomizes water by centrifugal force which flows over an electrical heater to produce steam. The temperature of the cooking cavity is measured and used to control the electric heater.

European Patent No. EP277888 to Violi published Aug. 10, 1988, appears to disclose an oven that uses a small boiler to generate steam which is mixed with combustion gasses from a gas burner and introduced into the cooking chamber.

U.S. Pat. No. 4,722,321 to Meister issued Feb. 2, 1988, discloses an oven with a boiler for providing steam and a heating coil surrounding a blower for providing heated convection gases. A temperature sensor is positioned in a bypass line to a discharge pipe.

SUMMARY OF THE INVENTION

In one aspect, the invention features an apparatus for heating an article having a heating chamber; an atomizer provided with a supply of water for producing an atomized water spray; a source of a combustible gas mixture; and a heating means for receiving and combusting the mixture and which is arranged to isolate hot combustion gases from the heating chamber. The heating means has a heat exchanger for receiving the heated combustion gas, and is adapted and arranged to vaporize the atomized spray to produce steam for heating an article in the heating chamber.

In various embodiments means are provided for providing steam at a dew point of 212° F. in the heating chamber; the heating means includes a first chamber for receiving the mixture and further mixing the same, and a second chamber, adapted to receive the mixture from the first chamber and including flame ignition means for initiating combustion; the first chamber includes a baffle member for deflection and mixing of the gas mixture; an exhaust is provided for removal of combustion gases from the heat exchanger, and wherein the heat exchanger includes first duct means for directing the combustion gases along a path that extends from the second chamber and second duct means adjacent to the first duct means for directing the gases to the exhaust, the heat exchanger includes interior fin members in communication with the combustion gases and exterior fin members in communication with the heating chamber, the fin members being arranged for efficient transfer of heat in a manner to inhibit excessively high temperature of the heating means; the heat exchanger includes exterior fin members on the first duct means leading the combustion gases away from the combustion chamber and interior fin member within the first duct means except absent on the portion of the interior of the first duct means adjacent the combustion chamber; the means for directing the atomized water spray comprises a blower; the apparatus includes a pair of the heating means and the blower includes a rotary cup atomizer, the exchangers being arranged at either side of the blower and each including a burner located near a position of maximum flow; the first duct means is positioned adjacent the blower; a trough is provided adapted to supply water to the rotary cup atomizer; means is provided for measuring the amount of steam in the heating chamber; a drain is provided in communication with the heating chamber, the drain having a passageway open to ambient, and wherein the measuring means includes a temperature sensor disposed in the passageway; a flame sensor is provided in the second chamber; the apparatus is adapted as a full size oven wherein the heating means is capable of heat output of at least 50,000 Btu/hr, the heating chamber can accomodate cooking pans of 18 by 26 inches and the outer has dimensions of the enclosure has less than or equal to about 41 inches wide by 38 inches high by 32 inches deep; the width is about 32 inches or less; the height is about 34 inches or less; the heating chamber has approximate dimensions of 20 inches high, by 26 inches deep, by 32 inches wide.

In another aspect, the invention further comprises an oven for heating food having an enclosure defining a heating chamber for holding food to be heated; an atomizer for producing an atomized water spray, the atomizer including a water cup and centrifugal blower mounted and engaged for rotation together, the water cup being disposed within and concentric with the blower; means for supplying water to the water cup; a source of a combustible gas mixture; and heating means for receiving and combusting the mixture while isolating hot combustion gases from the heating chamber, the heating means including a heat exchanger mounted on either side of the atomizer for receiving the hot combustion gases, each heat exchanger including a flat coplanar heat exchanger duct lying substantially in the plane of rotation of the blower, the heating means being adapted and arranged to vaporize atomized water spray directed over or in contact with external surface of the heat exchanger duct to produce steam for heating food in the heating chamber, and, a flat baffle mounted within the enclosure between the atomizer and the heating chamber, the baffle defining a central opening for influx of oven air to the blower and openings at the outer edges of the baffle for recirculation of air and steam into the cooking chamber.

In various embodiments, connected to each heat exchanger an exhaust is provided for removal of combustion gases therefrom, and wherein each of the heat exchanger ducts include a first duct portion for directing the combustion gases along a path that extends away from a combustion chamber and a second duct portion for directing the gases to the exhaust; the exchangers are each arranged such that the first duct portion is positioned adjacent to the blower, and the flow of combustion gases in the first duct portion in one of the exchangers is opposite to the direction of flow in the first duct portion in the other the exchanger; the means for supplying water to the cup includes a trough extending through the central opening.

In another aspect, the invention features a device and method for measuring the amount of steam in a steam oven, having source of steam; a heating chamber of substantially constant volume; an open passageway from the chamber to an ambient region where the flow of gases through the passageway is determined by the pressure difference between the chamber and the ambient pressure region, and a temperature sensor, is positioned in the passageway.

The invention provides an atmosphere of saturated steam at a dew point of 212° F. generated with a low cost heating source, i.e., gas heat and allows fast, thorough cooking without drying the food. Additionally, the need for a separate boiler is eliminated, and more space is available for the cooking chamber using a smaller physical envelope. Measurement of steam requires no water powered aspirators and therefore excess water usage is eliminated.

DESCRIPTION OF THE PREFERRED EMBODIMENT

We first briefly describe the drawings.

BRIEF DESCRIPTION OF THE DRAWINGS

FIG. 3 is a schematic sectional side view of a rotary cup atomizer taken along lines 3—3 of FIG. 3a.

FIG. 3a is a front view of the atomizer of FIG. 3.

STRUCTURE

Figure 1:
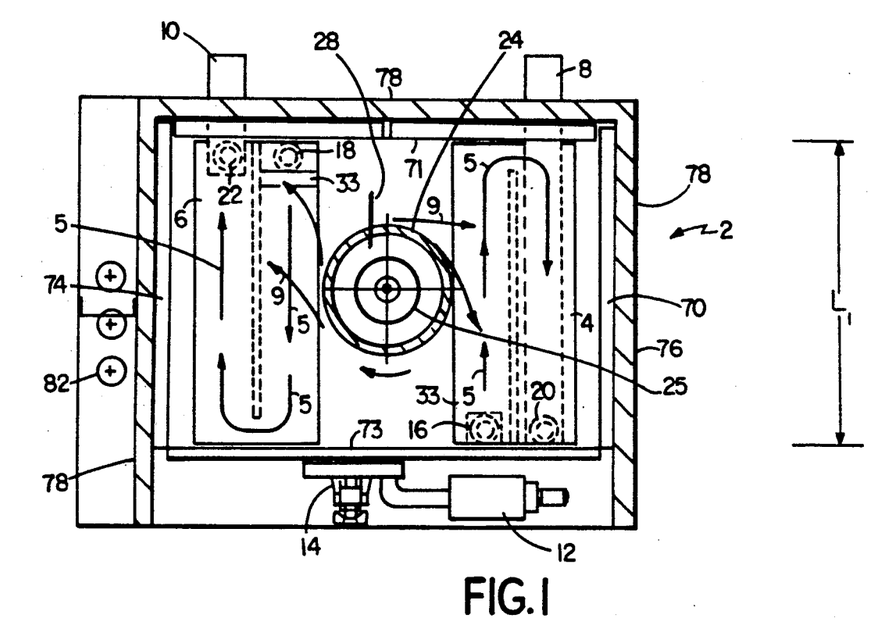
FIG. 1 is a sectional front view schematic of an oven according to the invention with the baffle removed.
Figure 2:
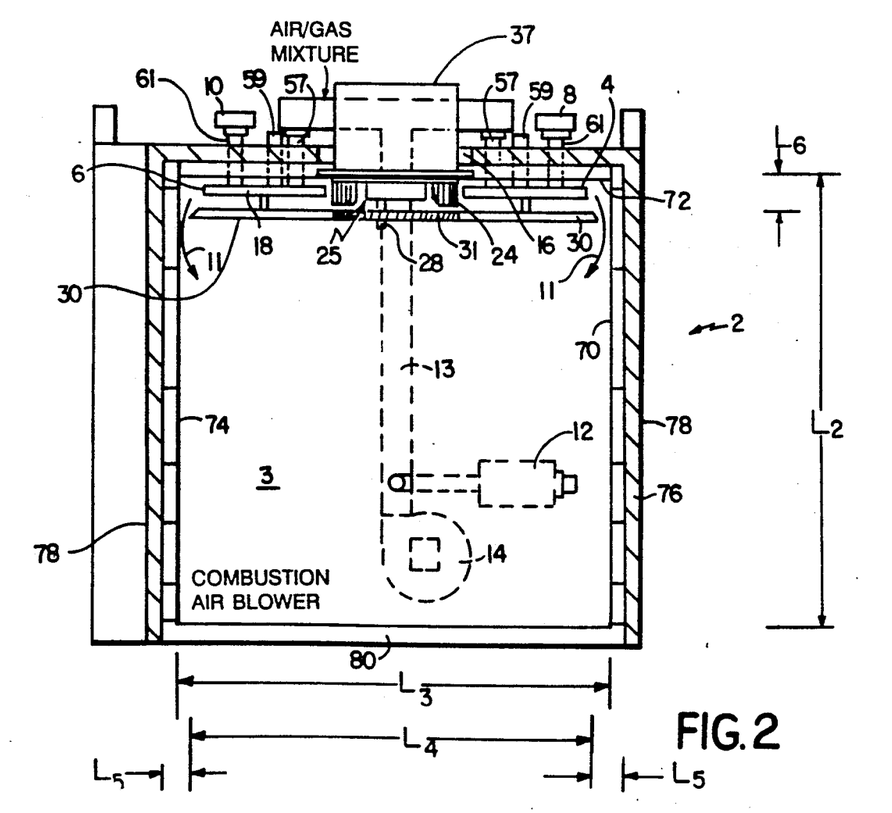
FIG. 2 is a sectional top view schematic of an oven.

FIGS. 1 and 2 illustrate an oven 2 for heating food articles in a heating chamber or cooking chamber 3 with steam or dry convection gases or a combination thereof. A mixture of combustible gases, such as natural gas and air, from a gas valve 12 and a blower 14, is distributed through appropriate tubing 13 (FIG. 2) to the inlets 16,18 of a pair of combination gas burners-heat exchangers 4,6. The gases are combusted in a combustion chamber 33 within the burner-exchangers, as will be described further below, and the hot combustion products are directed through heat exchanger duct work integral with the combustion chamber as illustrated by arrows 5. The combustion gases exit through outlets 20,22 and are exhausted to the ambient atmosphere through exhaust ducts 8,10. The noncondensible combustion gases are therefore kept separate from the cooking chamber 3, thus allowing heating with a saturated steam environment (dew point 212° F. at normal atmospheric conditions) within the chamber. As indicated by the arrows 5, the flow of combustion gasses, driven by the blower 14, may be in a downward direction in a portion of the heat exchanger ductwork.

Burner-exchangers 4,6 are arranged in the back of the cooking chamber 3 behind a baffle 30 (FIG. 2, baffle is removed in FIG. 1) and on either side of a centrifugal convection blower 24 (9-inch diameter) which is coupled for rotation with a concentric rotary cup atomizer 25 (3-inch diameter), as shown in FIGS. 1 and 2. Atomizer 25 and blower 24 are driven by a circulation motor 37, and rotate clockwise at. typically, 1800 rpm. The atmosphere in the heating chamber 3 is drawn into the convection blower 24 through a circular aperture 31 (8-inch diameter) in the baffle 30 centered on the rotational axis of the blower 24. The blower 24 directs a flow, schematically by arrows 9 in FIG. 1, over burner-exchangers 4,6 where water spray from the atomizer 25 may be vaporized to steam. The heated flow, indicated by arrows 11 (FIG. 2) is introduced to the cooking chamber 3 around the ends of the baffle 30.

In the embodiment described, the oven is considered to be "full-size", i.e., the cooking chamber receives heat of over 50,000 BTU/hr and is large enough to accommodate full size sheet pans measuring 18 inches by 26 inches. The oven has the following approximate dimensions. The chamber dimensions are $L_1$, 20 inches high, by $L_2$, 26 inches deep, by $L_3$, 32 inches wide for a total heating volume of 16,640 cubic inches. The cooking chamber is enclosed by walls 70, 71, 72, 73, 74 and door 80 supported within a cabinet housing 76. The oven includes insulation 78 within the housing 76, and a control panel 82 (FIG. 1), both of which may be conventionally arranged and constructed. The overall outer cabinet envelope of the oven 2 is 41 inches wide, by 38 inches high, by 32 inches deep. The control panel accounts for 7 inches of the width. The baffle 30 extends the height $L_1$ of the cooking chamber but is of a width, $L_4$, 30 inches, leaving a gap of $L_5$, 1 inch at its ends. The duct space between the baffle 30 and rear wall 72 of the cooking chamber is $L_6$, 3 inches.

Figures 3, 3A:
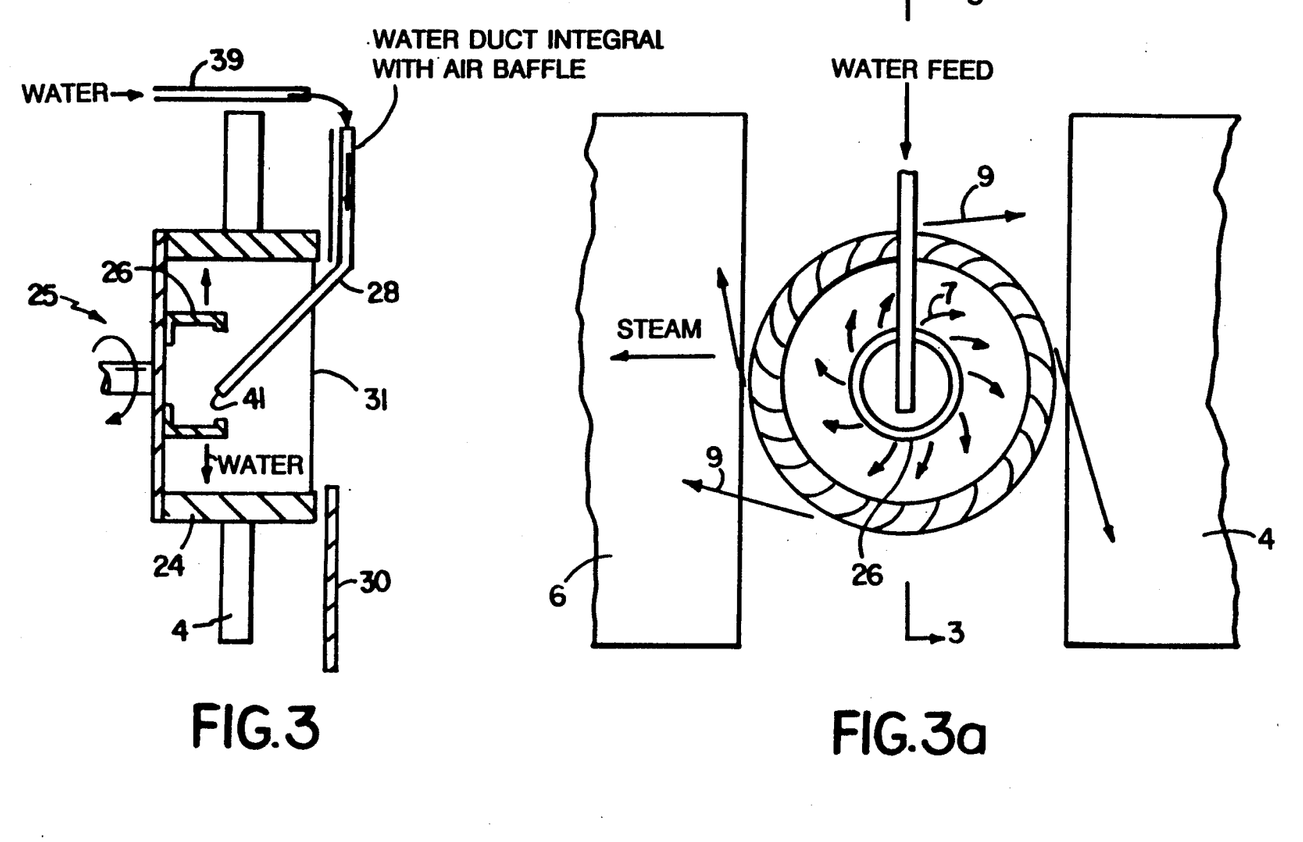

As shown more clearly in FIGS. 3, 3a, water is supplied to a cup 26 of atomizer 25 by a feed trough 28. The trough 28 engages the baffle 30 and is angled through the aperture 31 such that the end 41 of the trough 28 is positioned within cup 26. Water flows by gravity into the cup 25. The trough 28 is not connected physically to the plumbing from which it receives water, but rather, water falls from a main feed pipe 39 into the trough (a portion of which extends through a small aperture in the baffle 30 near the tube 39 as shown in FIG. 3). This allows easy disassembly for cleaning. Additionally, while tubing might also be used, a trough is advantageous since plugging by, for example, deposits from hard water is less likely and cleaning is also facilitated.

When the cup 26 spins, a spray is formed by centrifugal forces acting on water in the cup such that a spray of water droplets, schematically shown as arrows 7, (FIG. 3a) is propelled outwardly. The droplets enter the flow of the convection blower 24 and are driven against the burner-exchangers 4,6, as indicated by arrows 9, to be vaporized and form steam. The steam is introduced to the cooking chamber by flow around the edges of the baffle 30 as indicated schematically by arrows 11 (FIG. 2).

In a pure convection heating mode, the supply of water through feed trough 28 is cut off. The oven 2 thus acts to heat the air directed to the cooking chamber 3 by blowing the air over the burner exchangers 4,6. Alternatively, the amount of steam introduced into the cooking chamber 3 may be controlled, automatically, as will be described, by varying the water supply to the cup 26.

Figure 4:
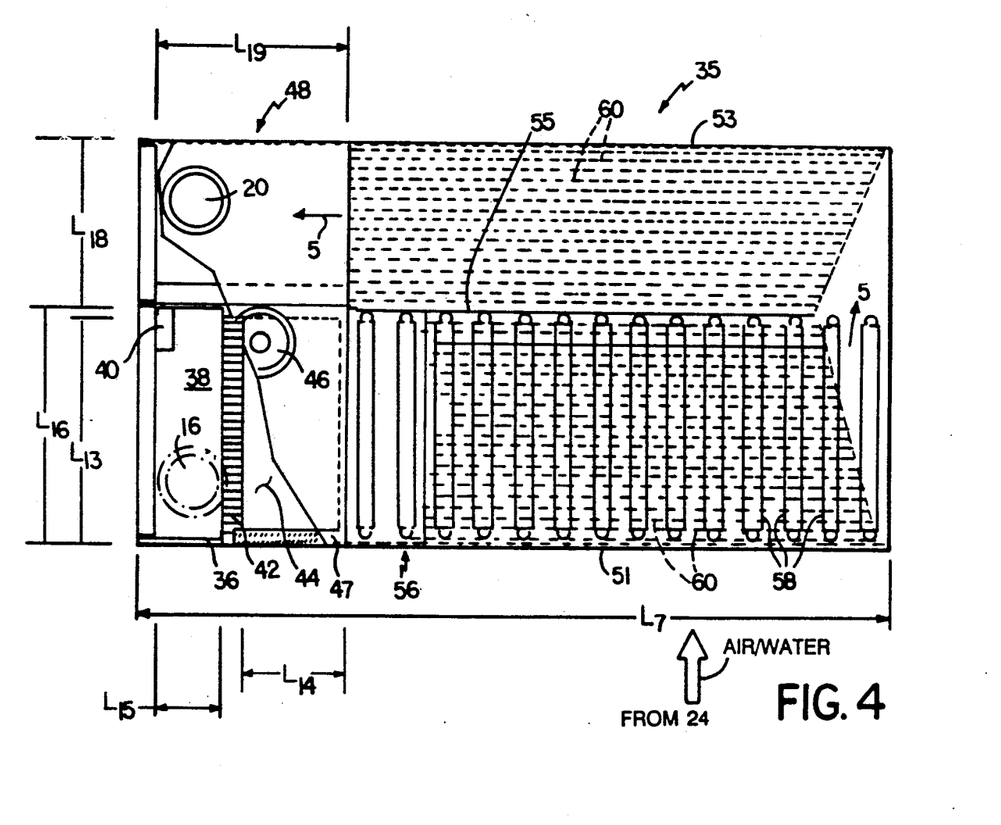
FIG. 4 is a partial sectional front view of a combination gas burner-heat exchanger.
Figure 4A:
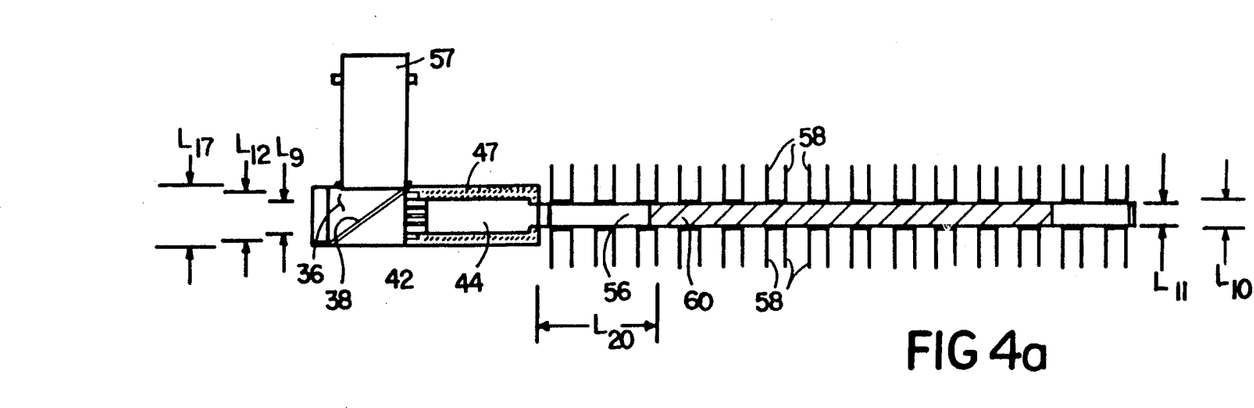
FIG. 4a is a cross sectional view of the burner exchanger of FIG. 4.
Figure 4B:
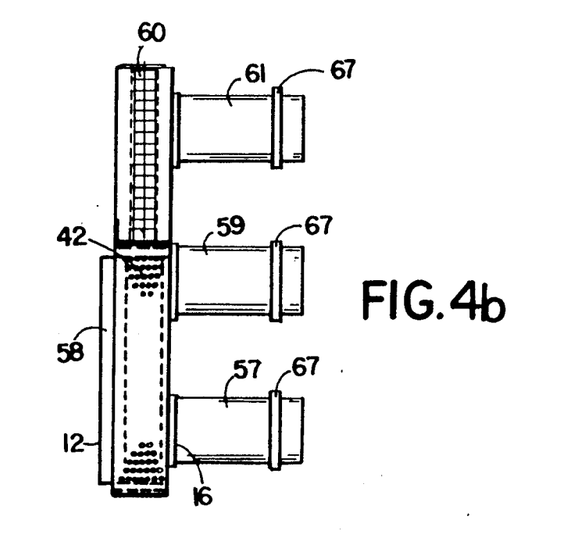
FIG. 4b is a partial sectional top view of the burner-exchanger of FIG. 4.

With reference to FIGS. 4, 4a and 4b, each of the burner-exchangers 4,6 (a single burner-exchanger is described below, however, like elements are found on both) include, integrally, a combustion unit 33, a heat exchange portion 35 and an exhaust region 48. The combustible gas mixture is introduced through tubing 57 (FIGS. 4a-4b) which mates with an inlet port 16 and directs the mixture to a plenum chamber 36 which includes a baffle 38. The baffle 38 extends the length of chamber 36 (FIG. 4) and includes a cut away portion 40 through which the gas mixture can pass to a burner tile 42 (permeable ceramic or metal ribbons) and into combustion chamber 44 which includes a combustion initiation means such as spark plug 46 held in a port tube 59 (FIG. 4b). The gas mixture is ignited and hot combustion gases are directed to the duct work of the heat exchanger 35. The spark plug 46 is also adapted to operate as a flame sensor. After ignition the ionization current between ground and hot leads of the plug 46 is measured as an indication of flame presence.

The volume of the combustion chamber 44 is sufficient to provide complete combustion at a temperature high enough to afford low emissions of carbon monoxide and unburned hydrocarbons (typically $T = 2500-3500°$ F., 3.6 million Btu/hr ft$^3$). The combustion unit 33 and the exhaust region 48 are formed of sheet metal integral with the exchanger 35 duct work and are thicker in cross section than the heat exchanger portion (FIG. 4a). The added thickness houses insulation 47 which provides an adiabatic residence time for complete combustion. An insulated combustion zone reduces two problems. First, the metal walls do not become so hot that thermal distortion and mechanical failure occur. Second, the flame is prevented from being quenched, especially by the spray of liquid water in the steam mode, which can cause the carbon monoxide emissions to exceed allowable specifications (800 ppm on an air-free basis). The insulation keeps the gases from "quenching", i.e., losing heat (temperature) before they have enough time to fully react.

Combustion noise is essentially eliminated by maximizing the burner area (without exceeding the physical envelope) and by adding baffle 38 in the chamber 36. This improves the burning flux rate and the flow uniformity of the burner. As a result, the system operates at a single fuel air ratio, (20 to 40% excess air) that allows low temperature starting, quiet operation (no noise), and acceptable temperatures (between about 1200° to 1350° F.) of the skin of the burner-exchanger 4,6.

The heat exchanger 35 directs the hot combustion products, as indicated by arrows 5 (FIG. 4), along a first duct portion 51 which extends outward from the combustion chamber 44, and then along a second portion 53, separated from the portion 51 by a partition 55, to the exhaust region 48. The hot combustion gas products are then exhausted through exit and port 20 and exit tube 61. The two-pass combustion gas configuration allows inlet and exhaust ducts to be located on the same end of the heat exchanger, helping to avoid thermal stresses.

The first duct portion 51 of the heat exchanger 35 includes outer fins 58 over which flow 9 (FIG. 1) is directed by the convection blower 24. Inner fins 60 (in phantom, FIG. 4) are arranged parallel to the flowing hot combustion gases within the exchanger 35. The inner and outer fins are constructed and arranged to provide a uniform heating of the external flow 9 and maintain reasonable skin surface temperatures, to avoid fatigue of the burner-exchanger components. In particular, inner fins are absent from a region 56 (FIG. 4a) into which the combustion products are introduced from the combustion chamber 44 so as to reduce the heat transfer efficiency to the skin and thereby avoid overheating of the skin in this region. The outer fins 58 extend generally over only the first duct portion 51 of the exchanger (the portion through which combustion products are directed away from the combustion chamber 44). In this portion 51, the combustion gases are relatively hot and heat transfer into the outer air flow 9 provided by the blower 24 is enhanced by fins 58. External fins are not provided on the second portion 53. The absence of fins on the portion 53 enhances mixing of the air flow heated by the fins 58 on portion 51 because fins tend to streamline the flow and their discontinuance causes turbulence. It will be understood, however, that fins could be provided over the return portion 53 of the exchanger as well, if desired.

The embodiment described has the following approximate dimensions. The burner-exchanger 4,6 has an overall length $L_7$ of 19.25 inches and a width $L_8$ of 10 inches. The outer thickness of the burner portion 33 and exhaust portion 48, $L_9$ is 1⅜ inches. The exchanger portion $L_{10}$ is ⅝ inches thick with an inner duct thickness $L_{11}$ of 0.5 inches. The high temperature insulation 47 lining the chamber 44 is fibrous $Al_2O_3/SiO_2$, e.g., Fiberfrax ® 0.25 inches thick. Chamber 44 is 11.8 cubic inches in size ($L_{12}$, 0.75 inches thick, $L_{13}$, 5.3 inches and $L_{14}$, 2.87 inches) and chamber 36 is 14 cubic inches in size ($L_{15}$, 2 inches, $L_{16}$, 5.8 inches, $L_{17}$, 1.2 inches). Baffle 38 is formed of a 2.3 inch by 5.8 inch 20-gauge steel plate and is held within the chamber 38 by tack welding. The cutaway 40 is of dimensions ⅛ inch by 3 inches. The inner fins 60 are spaced 0.25 inches apart. Exhaust chamber 48, $L_{18}$ is 3.9 inches wide and $L_{19}$, 4.7 inches.

The outer fins 58 form U-shaped channels and are 14-gauge stainless steel, one inch high and spaced half inch apart. They are initially positioned by tack welding to the heat exchanger surface and are subsequently brazed at the contact points for good thermal contact. The outer skins of the burner-exchangers 4,6 are formed in the shape of pans which fit one inside the other. When the pans are pressed together, they lie flat on the corrugated inner fins 60. This insures that in the subsequent brazing step there is intimate contact between the inner fins and pans to minimize resistance and insure good performance. The entire heat exchanger is assembled with inner fins 60 in place, and combustor installed. The burner-exchanger is weighted down and brazed, during which all contacting surfaces are automatically brought together and connected by the braze material. The fins 58 are brazed to the outside of the combustion gas side of the exchanger to augment heat transfer and to provide structural integrity at high operating temperatures.

Heat exchangers of this configuration have demonstrated a maximum skin temperature of 1300° F. at an oven temperature of 500° F. obtained with a firing rate of 25,000 Btu/hr in each burner-exchanger. For example, an amount of steam of about 3 to 4 lb./hr. may be formed at 212° F. As indicated earlier, inner fins 60 are removed in the portion 56 (FIG. 4a) so as to avoid possible overheating adjacent the combustion region. This allows some heat to be transferred from the unfinned gas space 56 to the outer fins 58, cooling the combustion gas somewhat before it contacts the inner fins 60 downstream of the portion 56 (a distance of $L_{20}$, 2 inches). Additionally, in experiments in which the portion 56 was without outer fins 58, the high heat transfer coefficient and extended surface inside the exchanger induced skin temperatures as high as 2300° F., sufficient to cause failure. To reduce the temperature to an acceptable limit of 1400° F., fins 58 are added to the air, or external flow, side.

The burner-exchangers 4,6 are positioned in a manner such that their hottest ends, the side having the combustion region 33, are arranged in diagonally opposite corners in the oven 2 to take advantage of the air flow patterns of typical blower wheels 24. In the case of a blower wheel rotating clockwise (facing the front of the oven) as shown in FIG. 1, the larger part of the air flow from the wheel is directed to the upper left and lower right hand corners of the oven. The combustor regions 33 of the burner-exchangers are, therefore, located in these corners in the path of this flow where the convection air flow is highest. A more uniform cooking temperature is achieved by placing the hottest portions of the burner exchange, i.e., portions closest to where combustion is taking place, in the region of the oven where flow from the blower is highest. This also reduces hot spots and wide temperature variations in the skin of the burner-exchanger. This results in a more even temperature distribution within the entire oven. Of course, a counterclockwise rotating blower would merely require relocating the combustor regions of the heat exchangers in the upper right and lower left corners.

The two passes of the heat exchangers are also arranged such that the first pass portion 51 is inboard, that is, next to the blower wheel. A cross parallel flow arrangement is created, which contributes to uniform air temperatures and lower skin temperatures.

Figure 5:
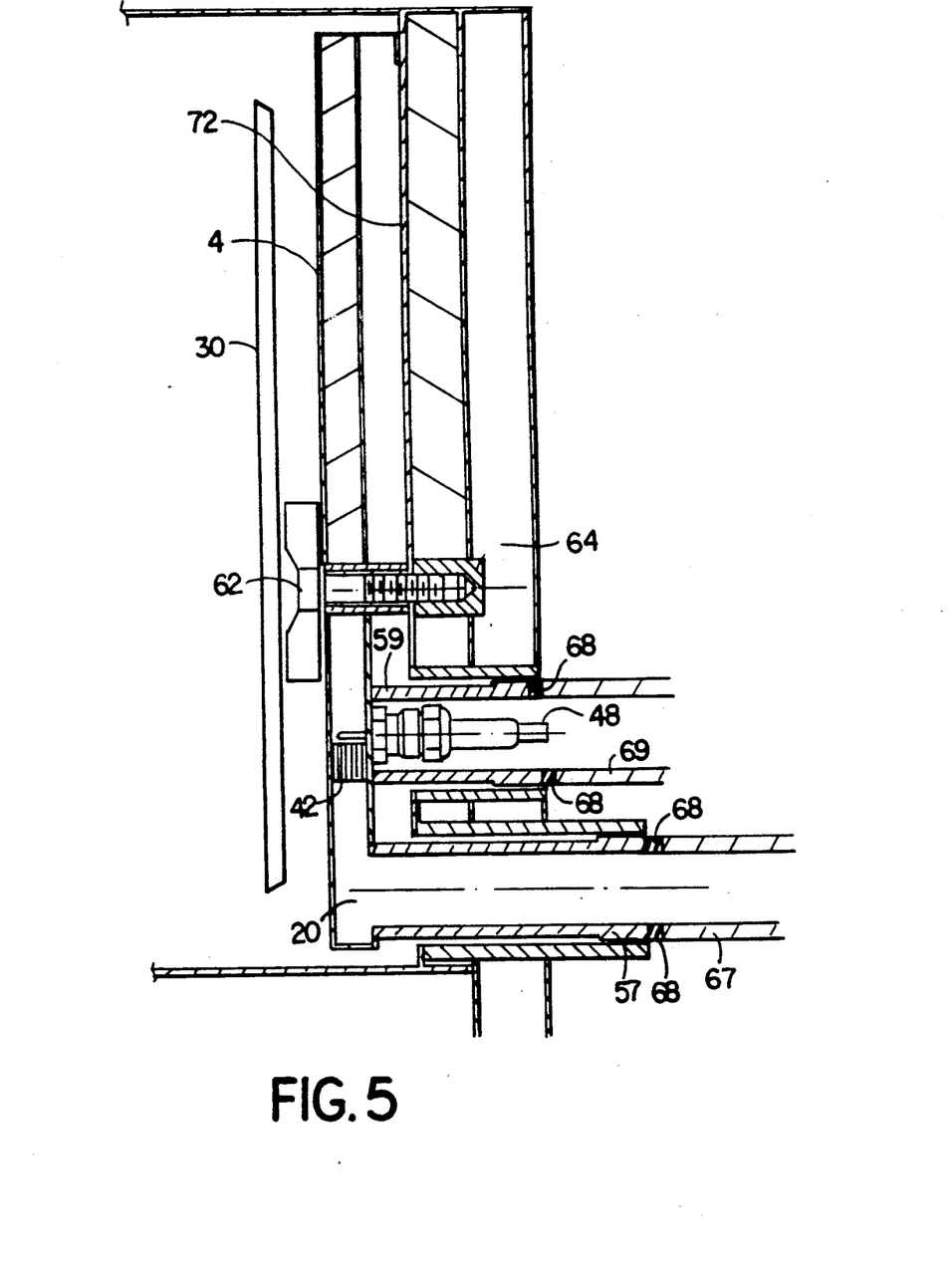
FIG. 5 is a side view of a burner exchanger installed in an oven.

As shown in FIG. 5, the heat exchangers (e.g., exchanger 6) in one embodiment (see FIGS. 8-8a for alternate embodiment) are held to the rear wall 72 of the cooking cavity by means of an anchoring fastener 62 which is threadably engaged through the exchanger and mates with a like threaded holding means 64 in the cavity wall 72. A spacer pad 66 holds the heated surfaces of the exchanger from directly contacting the wall 72.

A feature of the burner-exchangers 4,6 is the ease of their removal from the oven for cleaning. The burner exchanger are provided with tubes 57,61 (FIG. 4b) forming the gas/air inlet and exhaust connections, respectively. A similar tube 59 contains the ignition spark plug 46. As shown in FIG. 5, these tubes have metal faces which compress against elastomeric seals 68 (silicone) on the oven cooking cavity. Ducting and piping 65, 67, 69 are permanently attached to the oven rear wall 72 (or cabinet) and remain undisturbed when the heat exchanger is removed. Heat exchanger removal is accomplished from the front of the oven by unfastening the anchoring fastener 62. The spark plug 46 and its lead wire are also removed along with the heat exchanger and the wire then disconnected from inside the oven cavity.

Figure 6:
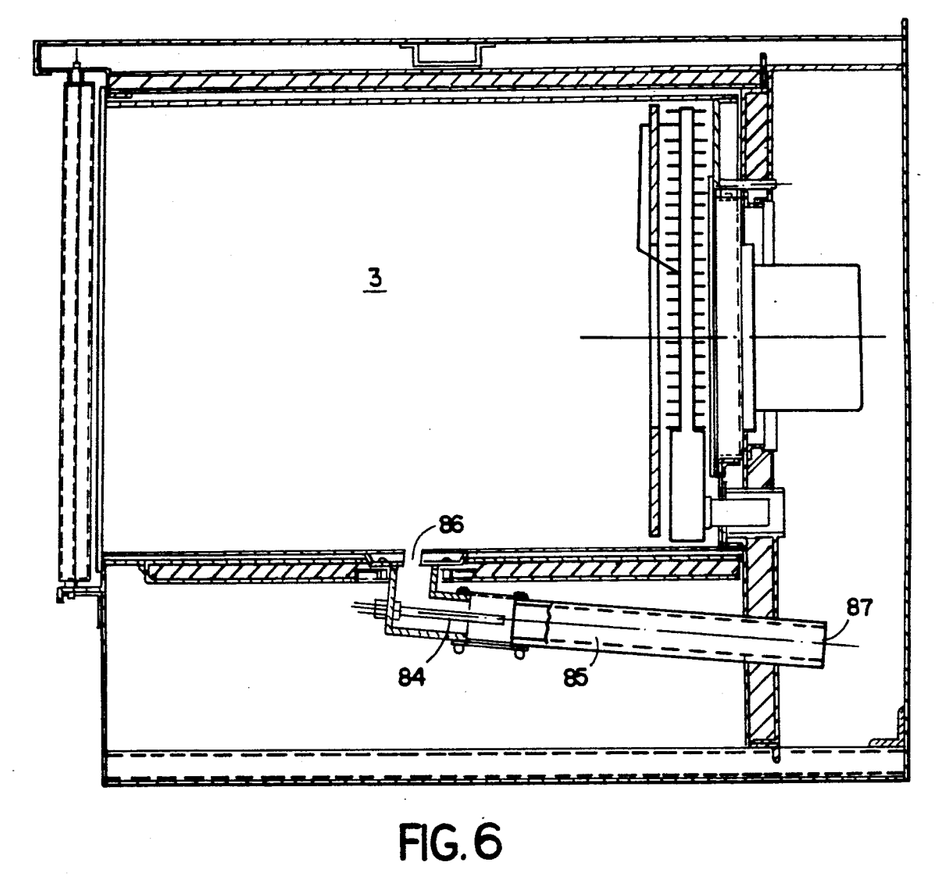
FIG. 6 is a side view of an oven including means for measuring the amount of steam in the heating chamber.

With reference to FIG. 6, the amount of steam in the heating chamber 3 is measured by means of a dew point sensor including a temperature sensor 84 supplied in a drain 85. A small hole 87 in the drain provides a flow of cool air from the ambient and therefore serves the purpose of providing a cool zone. As steam is added to the relatively fixed volume heating chamber 3, steam is displaced through an aperture 86 in the base of the chamber and directed through drain 85 and past sensor 84. The measured temperature is provided to control means which can control the introduction of water to the atomizer 25 and hence the amount of steam production.

A water solenoid valve can be actuated to feed water when the dew point is below a preset value. When the steam content of the oven is high, the tendency of the oven pressure to increase causes steam to flow over the sensor. When the steam content of the oven collapses, more ambient air is drawn over the sensor, tending to cool it. The sensing signal subsequently calls for more steam.

OPERATION AND CONTROL

The oven 2 may operate in a plurality of modes, for example, as a typical dry convection oven, as an atmospheric steamer, or as a combination of air and steam ranging from pure air to pure superheated steam.

The system allows heating of articles in a saturated steam atmosphere at a dew point of 212° F. under normal pressure conditions, with a low cost, gas burning heating source. Such steam heating is made possible by isolating noncondensible combustion gases from the heating chamber where steam is introduced (introduction of noncondensible gases into the heating chamber would reduce the dew point). At an oven temperature of 212° F., steam condenses onto food articles enabling high heating efficiency with no loss of natural moisture. At higher oven temperatures, superheated steam is produced in the heating chamber (dew point remains at 212° F.) and moisture tends to evaporate from food surfaces leading to a drying effect.

Figure 7:
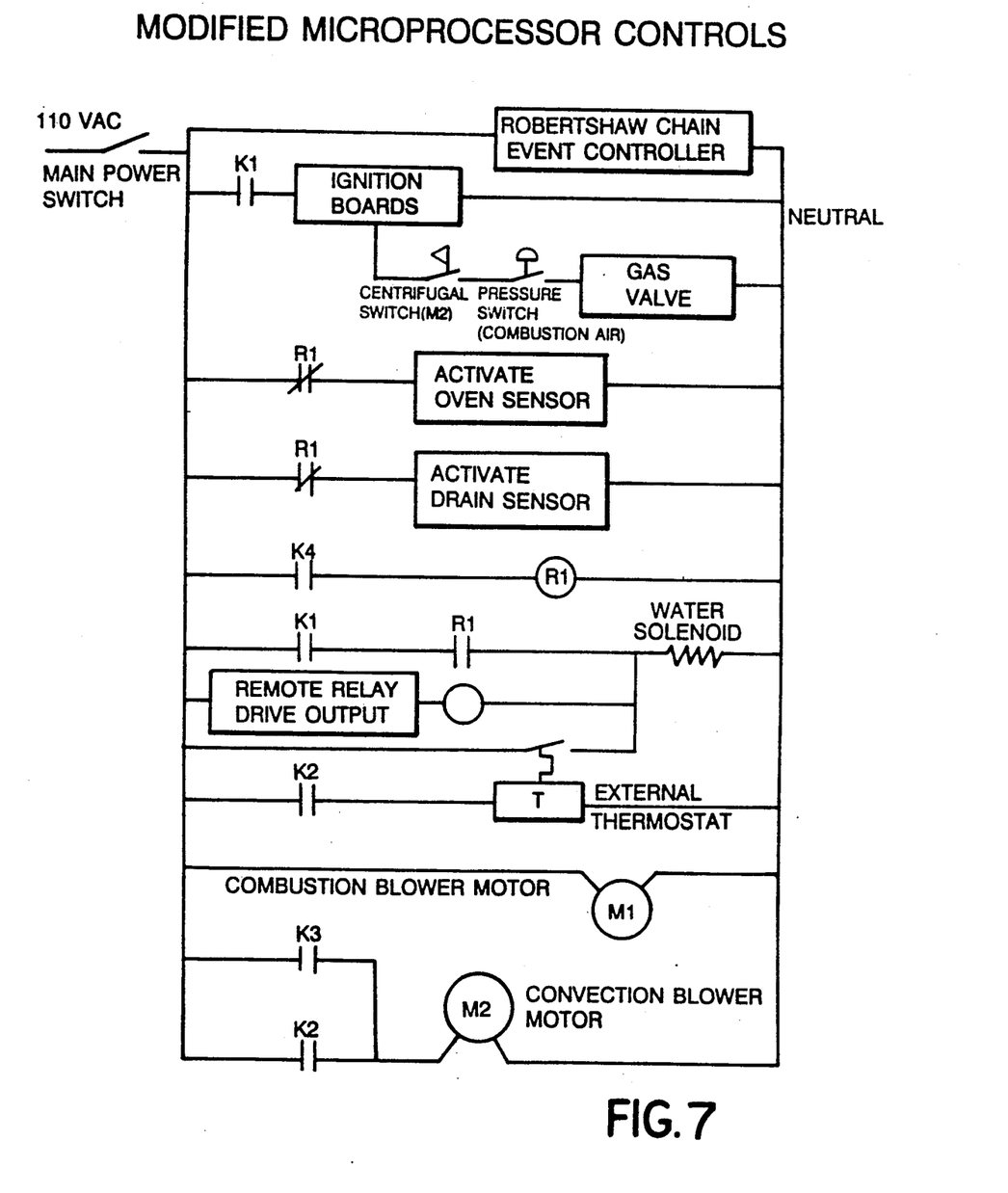
FIG. 7 is a control schematic for the oven of FIG. 6.

The oven control system incorporates a modified Robertshaw (Robertshaw Corp., Holland, Mich.) microprocessor, the COM 6700. FIG. 7 shows the overall electrical schematic of the controller integrated to the oven controls (gas valve, water solenoid, convection blower, and temperature sensing). The microprocessor also allows orchestration of any and all modes in any sequence and duration desired and also provides a "cook-and-hold" function whereby the oven can be automatically brought to a preset temperature after the cooking sequence is completed. The controls are further adapted to shut off the gas supply if the absence of flame is detected in either of the burner exchangers.

The system provides fast, thorough cooking using pure steam, heated convection gases or a combination thereof, using a gas heat source. The burner-exchanger permits an oven design that fits convenient oven envelope sizes. Further, the burner exchanger is easily removed for cleaning and servicing.

ALTERNATE EMBODIMENTS

Figure 8:
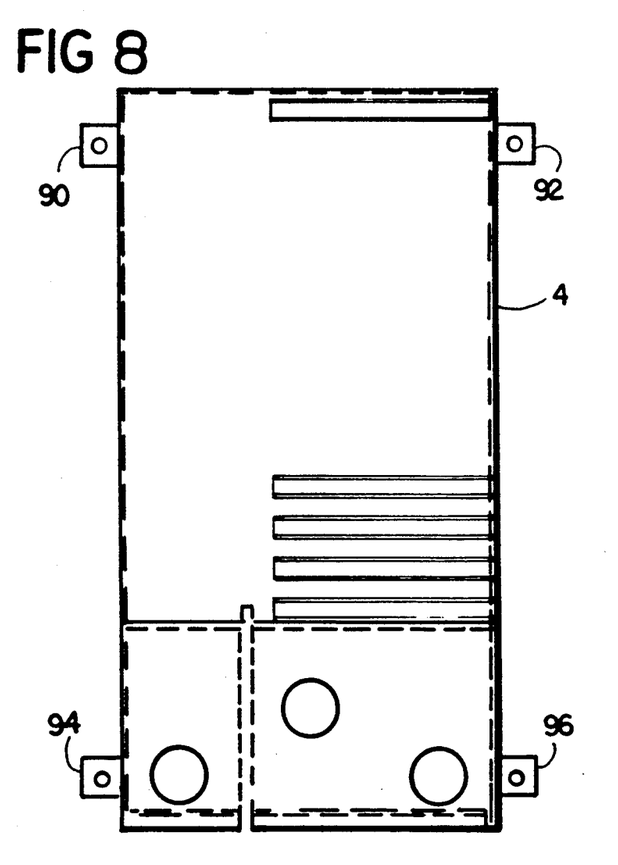
FIGS. 8 and 8a are front and side views of an alternate method for installing a burner exchanger.
Figure 8A:
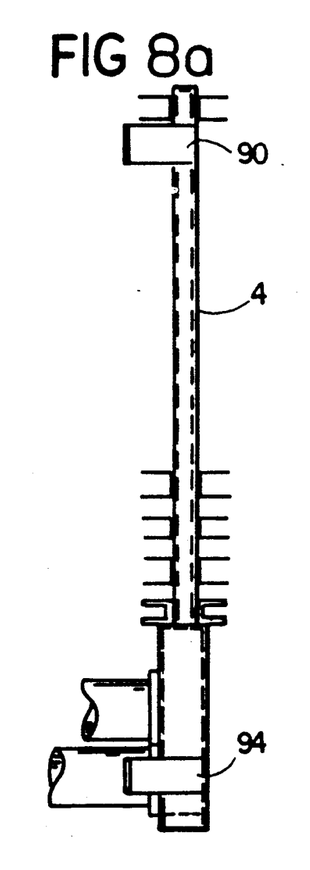

FIGS. 8-8a show an alternate embodiment for mounting the heat exchangers 4,6 in the oven 2. Brackets 90, 92, 94, 96 are welded to the exchanger 4. The brackets can then be bolted, through corresponding tapped holes, in the oven wall.

Other embodiments are within the following claims.

What is claimed is:

1. An oven apparatus for heating a food article with steam, comprising:
    an enclosure defining a heating chamber for holding an article to be heated;
    atomizing means for producing an atomized water spray;
    a source of a combustible gas mixture;
    heating means for receiving and combusting said mixture, said heating means arranged to isolate hot combustion gases from said heating chamber and including a heat exchanger for receiving the hot combustion gases adapted to have external surface temperatures sufficient to convert water to steam; and
    means for directing said atomized water spray over said external surface of said heat exchanger to produce steam for directing the steam to said heating chamber.

2. The apparatus of claim 1 including means for providing steam at a dew point of 212° F. in said heating chamber.

3. The apparatus of claim 1 wherein said heating means includes a first chamber for receiving said mixture and further mixing the same, and
    a second chamber, adapted to receive said mixture from said first chamber and including flame ignition means for initiating combustion.

4. The apparatus of claim 3 wherein said first chamber includes a baffle member for deflection and mixing of said gas mixture.

5. The apparatus of claim 3 including an exhaust conduit for removal of combustion gases from said heat exchanger, and wherein said heat exchanger includes first duct means for directing said combustion gases along a path that extends from said second chamber and second duct means adjacent to said first duct means for directing said gases to said exhaust.

6. The apparatus of claim 5 wherein said heat exchanger includes interior fin members in communication with said combustion gases and exterior fin members in communication with said heating chamber, said fin members being arranged for efficient transfer of heat in a manner to inhibit excessively high temperature of said heating means.

7. The apparatus of claim 5 wherein said heat exchanger includes exterior fin members on said first duct means leading said combustion gases away from said combustion chamber and interior fin member within said first duct means except absent on the portion of the interior of said first duct means adjacent said combustion chamber.

8. The apparatus of claim 5 wherein said means for directing the atomized water spray comprises a blower.

9. The apparatus of claim 8 when said apparatus includes a pair of said heating means having a pair of heat exchangers and said blower includes a rotary cup atomizer, said exchangers being arranged at either side of said blower and each including a burner located near a position of maximum flow.

10. The apparatus of claim 9 wherein said first duct means is positioned adjacent said blower.

11. The apparatus of claim 9 including a trough adapted to supply water to said rotary cup atomizer.

12. The apparatus of claim 1 further including means for measuring the amount of steam in the heating chamber.

13. The apparatus of claim 12 including a drain in communication with said heating chamber, said drain having a passageway open to ambient, and wherein said measuring means includes a temperature sensor disposed in said passageway.

14. The apparatus of claim 3 further including a flame sensor in said second chamber.

15. The apparatus of claim 1 adapted as a full size oven including a cabinet housing, wherein said heating means is capable of heat output of at least 50,000 Btu/hr, said heating chamber can accommodate cooking pans 18 inches in width by 26 inches in depth and an outer envelope of said housing is about 41 inches or less in width by 38 inches or less in height by 32 inches or less in depth.

16. The apparatus of claim 15 wherein said width of said outer envelope is about 32 inches or less.

17. The apparatus of claim 16 wherein said height of said outer envelope is about 34 inches or less.

18. The apparatus of claim 16 wherein said heating chamber has approximate dimensions of 20 inches high, by 26 inches deep, by 32 inches wide.

19. An oven for heating food comprising:
    an enclosure defining a heating chamber for holding food to be heated;
    an atomizer for producing an atomized water spray, said atomizer including a water cup and centrifugal blower mounted and engaged for rotation together, said water cup being disposed within and concentric with said blower;
    means for supplying water to said water cup;
    a source of a combustible gas mixture; and
    heating means for receiving and combusting said mixture while isolating hot combustion gases from said heating chamber, said heating means including a heat exchanger mounted on either side of said atomizer for receiving the hot combustion gases, each heat exchanger including a flat coplanar heat exchanger duct lying substantially in the plane of rotation of the blower, said heating means being adapted and arranged to vaporize atomized water spray directed over or in contact with external surface of said heat exchanger duct to produce steam for heating food in said heating chamber, and,
    a flat baffle mounted within said enclosure between said atomizer and said heating chamber, said baffle defining a central opening for influx of oven air to the blower and openings at the outer edges of the baffle for recirculation of air and steam into the cooking chamber.

20. The apparatus of claim 19 including connected to each heat exchanger an exhaust conduit for removal of combustion gases therefrom, and wherein each of said heat exchanger ducts include a first duct portion for directing said combustion gases along a path that extends away from a combustion chamber and a second duct portion for directing said gases to said exhaust.

21. The apparatus of claim 20 wherein the exchangers are each arranged such that said first duct portion is positioned adjacent to said blower, and the flow of combustion gases in said first duct portion in one of the exchangers is opposite to the direction of flow in said first duct portion in the other said exchanger.

22. The apparatus of claim 19 wherein said means for supplying water to said cup includes a trough extending through said central opening.

* * * * *

UNITED STATES PATENT AND TRADEMARK OFFICE
CERTIFICATE OF CORRECTION

PATENT NO. : 5,014,679

DATED : May 14, 1991

INVENTOR(S) : Paul Childs et al.

It is certified that error appears in the above-identified patent and that said Letters Patent is hereby corrected as shown below:

ON THE TITLE PAGE:

In the References Cited, add:

FOREIGN PATENT DOCUMENTS

| | | |
|---|---|---|
| 277888A | 8/1988 | Europe |
| 235061A | 9/1987 | Europe |

Signed and Sealed this

Twelfth Day of January, 1993

Attest:

DOUGLAS B. COMER

Attesting Officer  Acting Commissioner of Patents and Trademarks